US 6,654,616 B1

(12) United States Patent
Pope, Jr. et al.

(10) Patent No.: US 6,654,616 B1
(45) Date of Patent: Nov. 25, 2003

(54) WIRELESS AREA NETWORK HAVING FLEXIBLE BACKHAULS FOR CREATING BACKHAUL NETWORK

(75) Inventors: Frank Bingham Pope, Jr., Arlington, MA (US); Arthur Anthony Giordano, Burlington, MA (US); William Attilio Biagini, Needham, MA (US); Richard G. Eckard, Norfolk, MA (US); Donald Mugar Fye, Marietta, GA (US)

(73) Assignees: Verizon Laboratories Inc., Waltham, MA (US); GTE Wireless Service Corporation, Alpharetta, GA (US)

( * ) Notice: Subject to any disclaimer, the term of this patent is extended or adjusted under 35 U.S.C. 154(b) by 0 days.

(21) Appl. No.: 09/528,405

(22) Filed: Mar. 17, 2000

Related U.S. Application Data

(63) Continuation-in-part of application No. 09/406,676, filed on Sep. 27, 1999.

(51) Int. Cl.[7] .................................................. H04Q 7/38
(52) U.S. Cl. ..................... 455/556; 455/557; 455/445
(58) Field of Search ............................... 455/517, 550, 455/556, 557, 566, 575, 445, 404, 422; 370/331; 714/712; 375/200

(56) References Cited

U.S. PATENT DOCUMENTS

| | | | |
|---|---|---|---|
| 5,371,780 A | | 12/1994 | Amitay ........................ 455/450 |
| 5,384,826 A | | 1/1995 | Amitay ........................ 455/436 |
| 5,410,738 A | | 4/1995 | Diepstraten et al. ........ 455/58.2 |
| 5,457,736 A | | 10/1995 | Cain et al. ................... 455/439 |
| 5,479,400 A | * | 12/1995 | Dilworth et al. ............ 370/331 |
| 5,497,504 A | | 3/1996 | Acampora et al. .......... 455/436 |
| 5,499,243 A | | 3/1996 | Hall ............................. 370/331 |
| 5,528,583 A | | 6/1996 | Acampora et al. .......... 370/256 |
| 5,564,072 A | | 10/1996 | Garcia Aguilera et al. 455/56.1 |
| 5,577,042 A | | 11/1996 | McGraw, Sr. et al. ....... 370/257 |
| 5,581,596 A | | 12/1996 | Hogan ......................... 455/435 |
| 5,590,125 A | | 12/1996 | Acampora et al. ........... 370/397 |
| 5,612,960 A | * | 3/1997 | Stevens et al. ........... 455/517 X |
| 5,617,102 A | | 4/1997 | Prater .......................... 342/374 |
| 5,640,678 A | | 6/1997 | Ishikawa et al. ........... 455/33.2 |
| 5,648,958 A | | 7/1997 | Counterman ................ 370/458 |
| 5,793,762 A | | 8/1998 | Penners et al. ............. 370/389 |
| 5,818,619 A | | 10/1998 | Medved et al. ............. 359/172 |
| 5,854,985 A | * | 12/1998 | Sainton et al. .............. 714/712 |
| 5,898,904 A | * | 4/1999 | Wang ..................... 455/422 X |
| 5,907,544 A | * | 5/1999 | Rypinski ................ 455/517 X |
| 5,923,659 A | | 7/1999 | Curry et al. ................. 370/401 |
| 5,936,949 A | | 8/1999 | Pasternak et al. ........... 370/328 |
| 5,953,637 A | | 9/1999 | Coons et al. ................ 455/11.1 |
| 5,982,807 A | * | 11/1999 | Snell ........................... 375/200 |
| 6,002,918 A | * | 12/1999 | Heiman et al. ......... 455/566 X |

* cited by examiner

*Primary Examiner*—Nay Maung
*Assistant Examiner*—Philip J Sobutka
(74) *Attorney, Agent, or Firm*—James K. Weixel

(57) ABSTRACT

As demand for data services expands, users expect untethered ("wireless") systems to provide a same level of service as their tethered ("wired") systems. Described herein are systems and networks for providing high bandwidth wireless connectivity with user broadcast throughput of at least 1 Mbps. This connectivity is may be used in stationary, portable, and mobile computing environments. A communication system is described having a radio card for electrical communication with a transceiver. A wireless area network is described having a communication system and a wireless local area network adapted for broadcast communication with the communication system. The wireless local area network comprises one converter having a point-to-multipoint radio having at least a 10 MHz bandwidth, and another converter having a point-to-point radio having at least a 10 MHz bandwidth. The wireless local area network may form a cell of a plurality of cells in a wireless metropolitan network. A cell may be configured to be operatively coupled to a wired backhaul, which may be operatively coupled to a wide area network.

21 Claims, 4 Drawing Sheets

WIRELESS AREA NETWORK HAVING FLEXIBLE BACKHAULS FOR CREATING BACKHAUL NETWORK

RELATED APPLICATION

This is a continuation-in-part of commonly assigned, co-pending U.S. patent application Ser. No. 09/406,676 to Pope Jr., et al., entitled "Wireless Area Network", filed Sep. 27, 1999, the disclosure of which is incorporated herein by reference.

FIELD OF THE INVENTION

The present invention generally relates to wireless area network technology, and more particularly relates to a wireless metropolitan area network (WMAN).

BACKGROUND OF THE INVENTION

Computer technology is evolving. One aspect of this evolution is a move from stationary to portable computing devices, and in certain instances, moving to mobile computing devices. To facilitate portable and mobile computing, the computer industry is moving toward wireless communication. Technological efforts along these lines include cellular and wireless local area network (LAN) architectures.

In a cellular LAN architecture, a significant amount of infrastructure is needed. Using code division multiple access (CDMA), cellular systems are conventionally deployed with a single carrier signal in core population centers. However, to support an increase in demand for communication, a second carrier signal is being added to such CDMA cellular systems in major markets. Unfortunately, high-speed data applications consume a significant portion of bandwidth. Where voice and data communication share bandwidth, data communication is conventionally preempted by voice communication to avoid revenue loss. Accordingly, a new and extensive infrastructure addition is being evaluated to support this increase in demand for wireless data communication, especially with respect to mobile computing. Exacerbating this demand for bandwidth is a limitation of CDMA, which is bandwidth limited for vehicular mobility on the order of about 76.8 kilobits per second (Kbps) for second generation CDMA and 384 Kbps for third generation CDMA. By vehicular mobility, it is meant speeds in excess of 5 kilometers per hour. For non-mobile applications, third generation CDMA will support 2 megabits per second (Mbps).

Examples of wireless network architectures are "Ricochet" and "Autobahn", products of Metricom, Inc. of Los Gatos, Calif. Autobahn is a planned, but as yet undisclosed, system that allegedly is going to support 500 Kbps as a raw date rate with a user rate of 128 Kbps at pedestrian mobility. By pedestrian mobility, it is meant at speed equal to or less than 5 kilometers per hour.

Ricochet uses an unlicensed Industrial Scientific Medical (ISM) band at around 900 mega-hertz (MHz) for end-user interface. This wireless network architecture is bandwidth constrained on the order of about 100 Kbps raw data rate for pedestrian is mobility with a user rate of 28.8 Kbps. This system is also transmit-power limited having range below that of a cellular system, resulting in a microcellular architecture with an extensive backhaul network. Moreover, a substantial investment in infrastructure would be needed to match existing cellular capability. Furthermore, such a wireless network architecture has limited in-building penetration.

Because the above-described system architectures have limited data rates, it would be desirable to provide wireless access for untethered users with a higher data rate. Moreover, it would be desirable to provide such wireless access with a longer range and which could be more readily used indoors. Furthermore, it would be desirable to provide such wireless access with seamless roaming from cell to cell.

SUMMARY OF THE INVENTION

One aspect of the present invention is a communication system. Such communication system comprises a transceiver operatively coupled to an antenna and a computer system. The antenna may be selected for indoor or outdoor use. The computer system comprises a processor, memory, an input device, an output device and an input/output device. This input/output device is operatively coupled to the transceiver, and may be a radio card. Moreover, the transceiver may be an input/output device of the computer system, and the transceiver and radio card may be combined onto one card or may be separate cards.

Another aspect of the present invention is a wireless area network. Such wireless area network comprises at least one communication system and at least one wireless local area network adapted for broadcast communication with the communication system. The wireless local area network comprises two antennas, a range extender, two converters and a transit conduit for moving data and other information. One converter includes a point-to-point radio having at least a 10 MHz bandwidth, and the other converter includes a point-to-point radio having at least a 10 MHz bandwidth. The wireless local area network may form a cell of a plurality of cells in a wireless metropolitan area network.

Another aspect of the present invention is having a cell configured with at least one antenna, an optional range extender and at least one converter operatively coupled to a flexible backhaul. The flexible backhaul may be operatively coupled to a wide area network.

By functionally coupling the wireless local area network with a wireless metropolitan area network, the invention creates a seamless connection from end to end. Further, the flexible backhaul allows the use of either wired or wireless backhaul in the inventive system, increasing the number of equipment options for the network.

With one or more aspects of the aforementioned, it is anticipated that the broadband user throughput will exceed 1 Mbps, and this data transfer rate can be maintained while moving a communication system equal to or less than 5 kilometers per hour. Furthermore, it is anticipated that broadband user throughput of approximately 1 Mpbs can be maintained while moving a communication system greater than 5 kilometers per hour. Accordingly, this degree of throughput is comparable to wired LAN connectivity, and such connectivity is provided for untethered computing. Moreover, this architecture facilitates seamless roaming from one cell to another cell for portable and mobile computing, and this seamless roaming may be done while maintaining multiple sessions. Moreover, multiple users can access the same cell for shared usage.

These and other features, advantages, objects and embodiments of the present invention will become more apparent from reading the following Detailed Description of the Preferred Embodiments or by practicing the present invention.

DESCRIPTION OF THE DRAWINGS

The features of the present invention, as well as objects and advantages, will best be understood by reference to the appended claims, detailed description and accompanying drawings where:

In the drawings, same reference numbers refer to like components throughout the several figures.

DETAILED DESCRIPTION OF THE PREFERRED EMBODIMENTS

In the following detailed description, reference is made to the accompanying drawings which form a part of this detailed description, and in which, shown by way of illustrative example, specific embodiments are described. These embodiments are described in sufficient detail to enable those of skill in the art to practice the present invention. However, it is to be understood that other embodiments of the present invention not described herein in detail may be utilized. Therefore, the following detailed description is not to be taken in a limiting sense.

Figure 1:
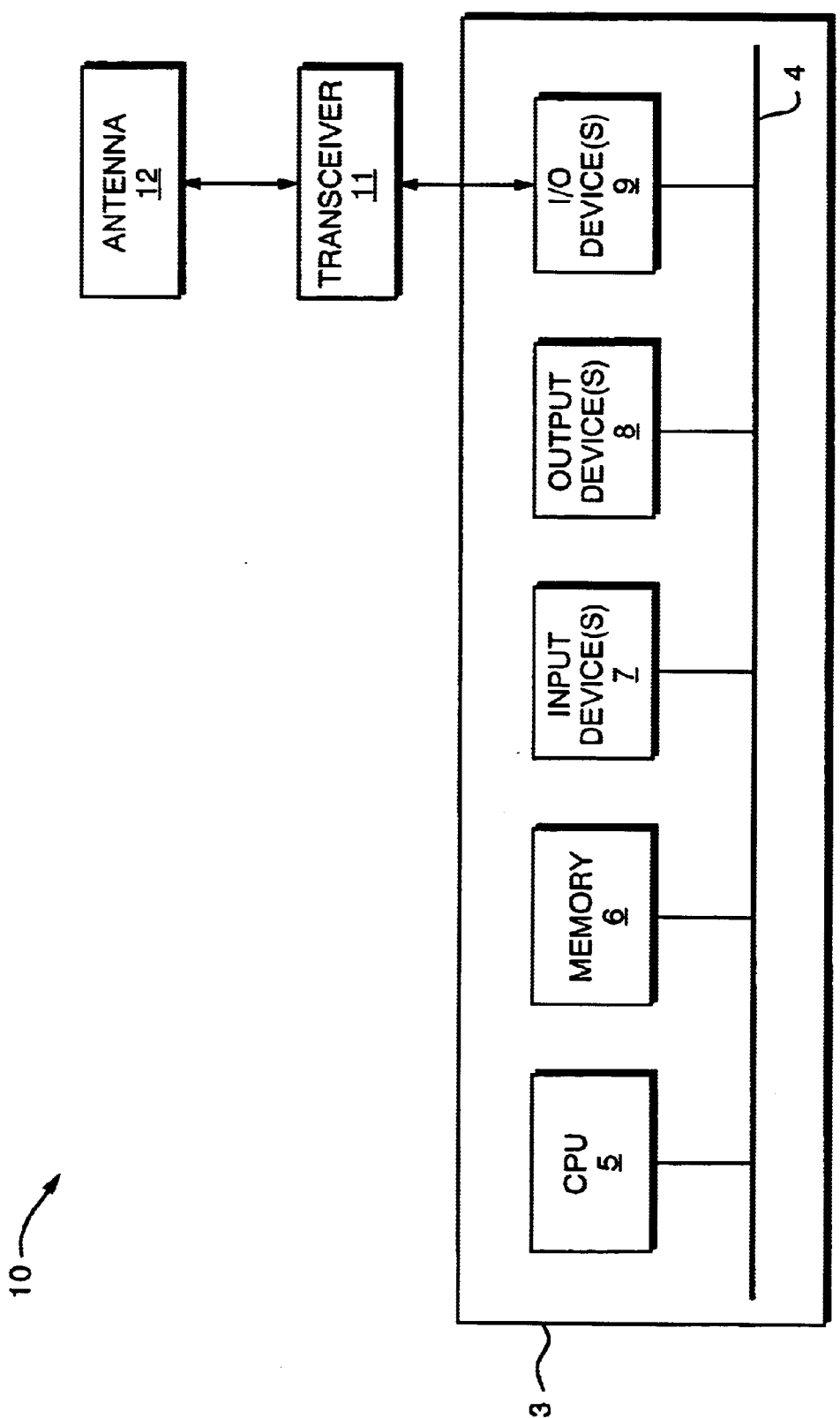
FIG. 1 is a block diagram of an exemplary portion of an embodiment of a communication system in accordance with the present invention.

Referring to FIG. 1, there is shown a block diagram of an exemplary portion of an embodiment of a communication system 10 in accordance with the present invention. Communication system 10 comprises computer system 2, antenna 12 and transceiver 11. Computer system 3 comprises a processor 5, memory 6, one or more input devices 7, one or more output devices 8, and one or more input/output (I/O) devices 9, operatively coupled to one another via buses 4. At least one I/O device 9 is a radio interface ("radio card"). The radio card 9 in the invention should be able to operate using many different kinds of backhaul, preferably both wired and wireless, creating a common interface so that any type of easily obtainable backhaul could be used in conjunction with the radio card 9. This flexible, generalized backhaul option creates multiple options in which a local signal from an end user can reach the remainder of the wireless network.

Operatively coupled to radio card 9 is transceiver 11. Transceiver 11 is preferably external to computer system 3 to avoid interference; however, transceiver 11 may be part of computer system 3, such as being on a separate I/O card or being combined with radio card 9. Transceiver 11 may be configured to radiate at a maximum level permitted for a designated licensed or unlicensed band, such as according to IEEE 802.11 b, a power booster may be used in conjunction with the transceiver 11 to improve indoor service coverage.

Operatively coupled to transceiver 11 is antenna 12. Preferably, transceiver 11 and antenna 12 have sufficient gain to provide a broadcast range of approximately 3 to 5 kilometers; in other words, transceiver 11 with antenna 12 is set to operate with approximately 4 watts of effective radiated power (ERP). By way of example and not limitation, antenna 12 may be a mini dish, such as a 5 inch diameter mini dish.

By way of example and not limitation, computer system 3 may include a desktop, notebook or laptop personal computer programmed with a UNIX, WindowsNT or Windows98 operating system having a radio card, transceiver, and antenna selected from Adaptive Broadband Corp. (formerly, California Microwave) of Sunnyvale, Calif. The transceiver from Adaptive Broadband Corp. uses time division multiple access (TDMA) and is capable of duplex communication. However, a CDMA, FDMA, and TDMA technology, or a hybrid thereof, may be used. Moreover, communication system 10 may be programmed with well-known mobile Internet Protocol (IP) software, firmware, and the like, including but not limited to mobile IP-like and similar technologies for access across sub-networks.

Transceiver 11 may be configured to operate in accordance with IEEE 802.11. This standard includes a media manager and operates in an unlicensed band at or about 2.4 giga-hertz (GHz). Alternatively, transceiver 11 may be configured to operate at or about 5.3 or 5.8 giga-hertz (GHz) unlicensed national information infrastructure (UNII) band. Use of the UNII spectrum is attractive owing to flexibility in establishing a network in a realistic operational environment without regulatory delays and relatively low probability of interfering signals with respect to other users. However, for quality of service issues, a suitably protected licensed band may be used.

Figure 2:
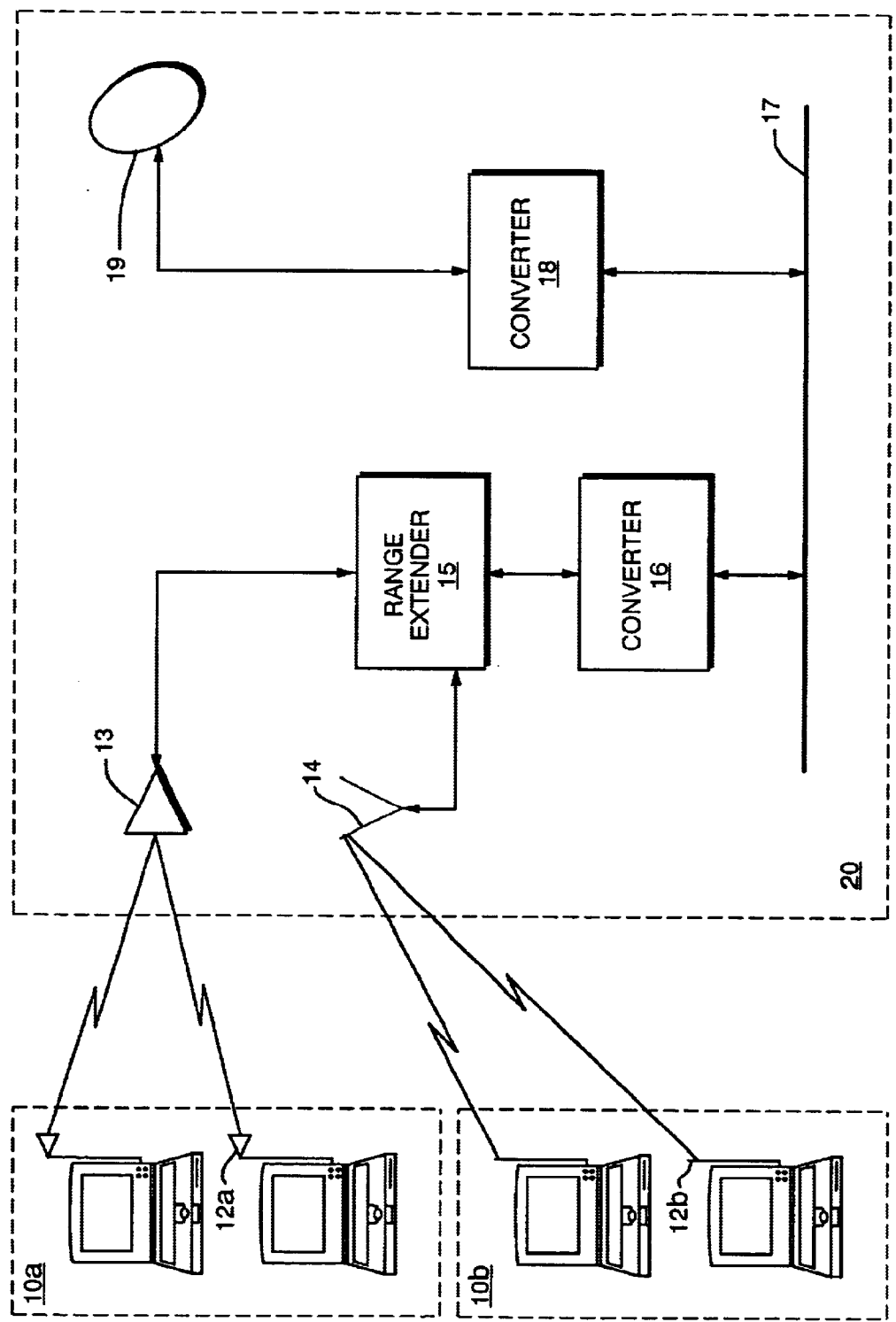
FIG. 2 is a block diagram of an exemplary portion of an embodiment of a wireless LAN (WLAN) network in accordance with the present invention.

Referring to FIG. 2, there is shown a block diagram of an exemplary portion of an embodiment of a wireless LAN (WLAN) network in accordance with the present invention. Communication systems 10A and 10B are in electrical communication with antennas 13 and 14, as illustratively shown. Accordingly, antennas 13 and 14 may be respective bi-directional antennas, as are antennas 12A and 12B. Communication systems 10A and 10B are similar to one another and to communication system 10 of FIG. 1. Communication systems 10A are each configured with a directional high gain antenna 12A for outdoor use, and communication systems 10B are each configured with an omni-directional antenna 12B for indoor use. By way of example and not limitation, a high gain antenna conventionally has a gain of approximately equal to or greater than 6 dBi.

Local WLAN 20 uses antennas 13 and 14 for two-way communication with communication systems 10A and 10B. Antennas 13 and 14 may be operatively coupled to range extender 15 to improve the quality of the local coverage. Range extender 15 is operatively coupled to converter 16. Converter 16 receives information sent from communication systems 10A and 10B, and converts it into a format for transport over transit conduit 17. Likewise, converter 18 receives information from antenna 19, and converts it into a format for transport over transit conduit 17. Furthermore, converter 16 receives information in a network transport format from transit conduit 17, and converts it into a format for broadcast via at least one of antennas 13 and 14. Likewise, converter 18 receives information in a network transport format from transit conduit 17, and converts it into a format for broadcast via antenna 19. Converter 16 comprises a point-to-multipoint radio for microcell-to-end user communication having a bandwidth of at least 10 MHz. Converter 18 comprises a point-to-point radio for communication with a repeater, another cell, or a receiver coupled to a flexible backhaul. Point-to-point wireless communication between antennas 19 comprises a bandwidth of at least 10 MHz. Moreover, at least a portion of Local WLAN 20 may be programmed with well-known mobile Internet Protocol (IP) software, firmware, and the like, including but not limited to mobile IP-like and similar technologies for access across sub-networks. Also, local WLAN 20 can include a lamppost height microcell radioport configured for wired or wireless backhaul to link higher elevation microcells.

By way of example and not limitation, range extender 15 may be selected from Young Design Inc. of Falls Church, Va.; converter 16 may be a WLAN access point selected from Young Design Inc. of Falls Church, Va.; transit conduit may be selected from 10BaseT Ethernet or 100BaseT Ethernet Netgear products of Nortel Networks Corporation of Brampton, Ontario, Canada; converter 18 may be selected from radio 10BaseT Ethernet, WaveSpan Corp. of Mountain View, Calif.; and antenna 14 may be selected from a RadioLAN product of Sunnyvale, Calif.

Converter 16 and range extender 15 may be divided up into multiple broadcast sectors. An example of such a sectored system is available from Adaptive Broadband Corp. (formerly, California Microwave) of Sunnyvale, Calif.

In short, local WLAN 20 provides a microcell having an operating radius of about 3 to 5 kilometers with respect to use of antenna 13. Microcells are interconnected to one another via a high-speed wireless backbone network, as is described in more detail hereinbelow.

Figure 3:
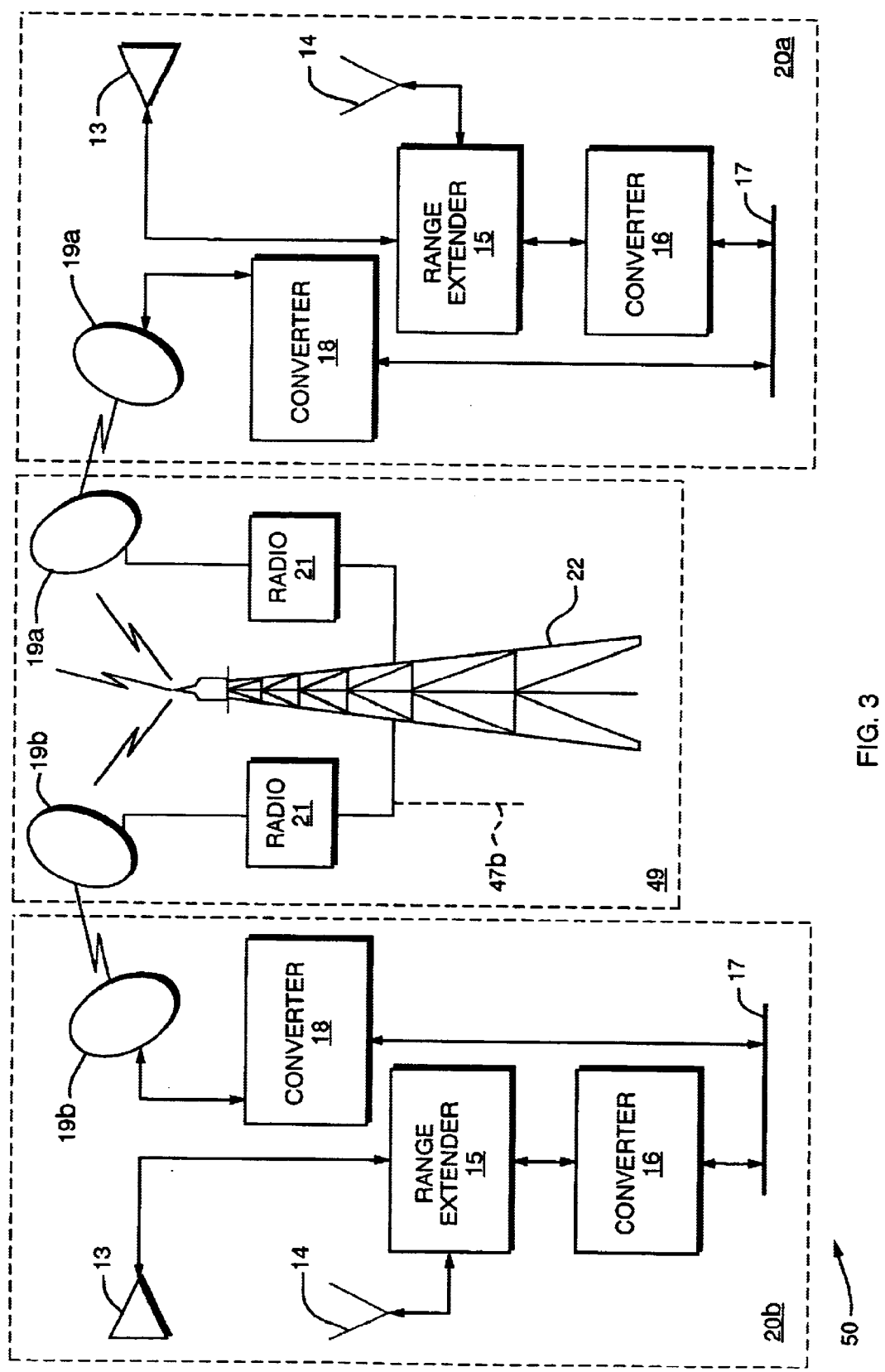
FIG. 3 is a block diagram of an exemplary portion of an embodiment of a wireless metropolitan area network (WMAN) in accordance with the present invention.

Referring to FIG. 3, there is shown a block diagram of an exemplary portion of an embodiment of a wireless metropolitan area network (WMAN) 50 in accordance with the present invention. WMAN 50 is an architecture that facilitates portable, mobile and fixed wireless communication, such as with a communication system 10. A LAN-like data connectivity over a metropolitan area is provided with raw data rates of at least about 10 Mpbs full duplex, and preferably in a range of about 10 to 155 Mbps. Moreover, it is anticipated that broadband user throughput will exceed 1 Mbps, and this data transfer rate can be maintained while moving a communication system 12 equal to or less than 5 kilometers per hour. Furthermore, it is anticipated that broadband user throughput of approximately 1 Mbps can be maintained while moving a communication system 12 greater than 5 kilometers per hour. This architecture facilitates seamless roaming from one cell to another cell for portable and mobile computing, and this seamless roaming may be done while maintaining multiple sessions. By seamless, it is meant that a user will not have any service interruptions while roaming. Moreover, multiple users can access a cell for shared usage. Such wireless access may be to an Intranet or to the Internet. Notably, by accessing an Intranet well-known technology for getting behind a firewall is used.

Local WLANs may be put in electrical communication with one another using repeater 49. Repeater 49 is disposed for providing and receiving information to and from antenna 19B of local WLAN 20B using antenna 19B of repeater 49, and for providing and receiving information to and from antenna 9A of local WLAN 20A using antenna 19A of repeater 49. Information is passed between antennas 19A and 19B of repeater 49 using at least two two-way (send and receive) radios 21, and more than two radios 21 may be used as illustratively shown. By way of example and not limitation, antennas 19A and 19B may be directional. Radio 21 may be selected from WaveSpan Corp. of Mountain View, Calif.

Figure 4:
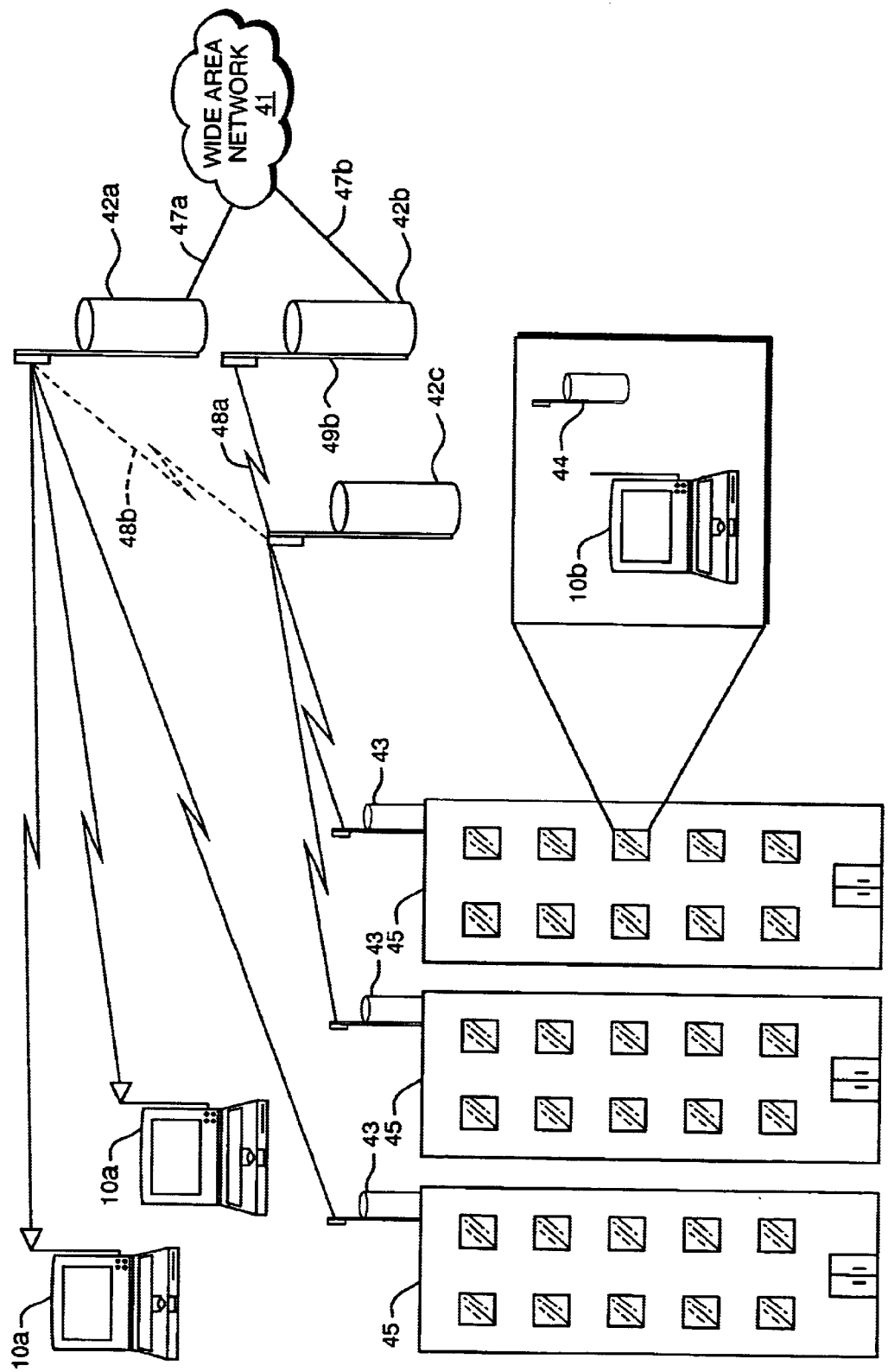
FIG. 4 is a network diagram of an exemplary portion of an embodiment of a WMAN in accordance with the present invention.

Referring to FIG. 4 there is shown a network diagram of an exemplary portion of an embodiment of a WMAN 100 in accordance with the present invention. Generally, flexible backhaul links connect the microcell radioports described above to create a point-to-multipoint microcell-to-macrocell backhaul network. More specifically, communication systems 10A are in electrical communication with a local WLAN 42A. Local WLAN 42A provides a "cell site" for local communication thereto and therefrom. Local WLAN 42A is operatively coupled to wide area network (WAN) 41 via a backhaul 47A, and local WAN 41 is operatively coupled to local WLAN 42B via backhaul 47B. Backhauls 47A and 47B may be configured to provide bandwidth equal to or greater than 10 Mbps. Backhauls 47A and 47B may be operatively coupled to a point-of-presence (POP), internet service provider (ISP), asynchronous transmission mode (ATM) switch, router, and the like for connectivity to the Internet, or an Intranet or Extranet. Local WLAN 42A may omit antenna 19 and converter 18, and transit conduit 17 may form at least a portion of backhaul 47A.

Local WLANs 42B and 42C are in electrical communication with one another via a backhaul 48A. As noted above, backhauls 47A, 47B and 48A are flexible, allowing the use of any wired or wireless backhaul (e.g. ADSL, XDSL, MMDS, LMDS, T1 connections, etc.) that could be opportunistically obtained. Further, backhaul 48A may be configured to provide bandwidth equal to or greater than 10 MHz. Notably, if local WLANs 42A and 42C are sufficiently proximate to one another, alternate routing of information may be used. This may be important if a portion of connectivity is not available or busy. Moreover, backhaul 48A may have a fixed transmission rate for point-to-point communication. Alternatively, WLAN 42B may be replaced with a portion of repeater, namely tower 49B. Tower 49B comprises at least one antenna 19 and at least one radio 21. Radio 21 is connected to backhaul 47B.

Buildings 45 may have equivalent or scaled down versions of local WLANs 42A through 42C, namely terminal WLANs 43. Moreover, terminal WLANs 43 may be omit elements of a local WLAN 20 (shown in FIG. 2).

With continuing reference to FIG. 4 and renewed reference to FIG. 2, one or more buildings may be configured via a wired or wireless link for a direct connection to transit conduit 17. Accordingly, terminal WLANs 43 may omit antennas 13 and 14, range extender 15 and converter 16 in such an embodiment. Alternatively, at least one access point 44 may be located in building 45 for indoor use by communication system 10B. One or more access points 44 may form a portion of antenna 14. Accordingly, terminal WLAN 43 may omit antenna 13 of local WLAN 20 in such an embodiment. Moreover, building 45 may be configured for both direct connection to transit conduit 17 and wireless connection via an access point 44. Moreover, commercially available indoor wireless LAN products may be used, such as WaveLAN from Lucent Technologies of Murray Hills, N.J. or a RadioLAN product of Sunnyvale, Calif.

In summary, the present invention is an integrated system having a flexible backhaul, which allows the choice of a wired or wireless backhaul. More particularly, the inventive system includes fixed point-to-multipoint connections coupled to a portable, wireless, low power connection to an end user device. The system includes a WLAN that has a plurality of microcells. Each microcell connects at least one individual device (e.g. a computer) to the network via a wireless drop. Each microcell is associated with a macrocell such that each macrocell connects a plurality of microcells. The number and spacing of the microcells and macrocells is based in part on the spacing of the cells, the data requirements for the network and the user density. The wireless connection between each individual user and its associated microcell in the inventive network allows the user to connect to the network without requiring disruptive, complicated installation of fixed equipment at the user's location, increasing convenience and mobility white at the same time reducing installation costs. Further, in a preferred embodiment of the inventive system, the individual components (e.g. radio card, power booster) throughout the network is available off-the-shelf and uses industry standard bandwidths and frequencies. Thus, the invention takes advantage of economies of scale that are not available in proprietary systems.

Although the present invention has been particularly shown and described with respect to certain embodiments thereof, including without limitation a best mode if any, it should be readily apparent to those of skill in the art that various structural, logical, electrical, and other changes in form and detail may be made to these embodiments without departing from the scope of the present invention as set forth in the appended claims. For example, well-known wireless user access control may be used for security purposes; well-known link and network level security may be used; well-known Quality of Service control using forward error correction, dynamic control of bandwidth, flexible modulation formats, and the like may be used; well-known distributed monitoring and control of network elements for maintenance and administration problem diagnosis and repair may be used; and well-known subscriber usage monitoring for billing may be used.

Accordingly, the present invention is defined only by the appended claims that follow this detailed description.

What is claimed is:

1. A communication system comprising:
    a transceiver having an operating frequency and a first data format;
    a first antenna operatively coupled to the first transceiver for transmitting and receiving the first data format and configured to wirelessly communicate with a second antenna, the second antenna operatively coupled to a first converter for converting data between the first data format and a second data format for transmission along a transit conduit, the transit conduit including a flexible backhaul, which provides both wired and wireless backhaul options; and
    a computer system, the computer system comprising a processor, memory, an input device, an output device, the input/output device operatively coupled to the transceiver;
    wherein the transceiver and the first antenna in combination have a broadcast range of approximately 3 to 5 kilometers.

2. The system of claim 1, wherein the input/output device is a radio interface.

3. The system of claim 1, wherein the operating frequency is within a range of approximately 5.3 to 5.8 GHz.

4. The system of claim 1, wherein the transceiver with the first antenna provides approximately 4 watts of effective radiated power.

5. The system of claim 1, wherein the transceiver operates at approximately 2.4 GHz.

6. The system of claim 1, wherein the transceiver is configured to operate in accordance with IEEE 802.11.

7. The system of claim 1, wherein the transceiver operates at approximately 5.8 GHz.

8. The system of claim 1, wherein the transceiver uses an unlicensed information infrastructure band.

9. The system of claim 1, wherein the first antenna is a directional antenna having a gain equal to or greater than 6 dBi.

10. The system of claim 1, wherein the first antenna is an omni-directional antenna.

11. The system of claim 1, further comprising:
    a second converter connected to the transit conduit, the second converter being used for converting data between the second data format and a third data format, the second converter comprising at least a portion of a wireless backhaul and having a point-to-point radio; and
    a third antenna operatively coupled with the second converter.

12. A communication system comprising:
    a transceiver having an operating frequency and a first data format;
    a first antenna operatively coupled to the first transceiver for transmitting and receiving the first data format and configured to wirelessly communicate with a second antenna, the second antenna operatively coupled to a first converter for converting data between the first data format and a second data format for transmission along a transit conduit, the transit conduit including a flexible backhaul, which provides both wired and wireless backhaul options; and
    a computer system, the computer system comprising a processor, memory, an input device, an output device, the input/output device operatively coupled to the transceiver;
    wherein the transceiver with the first antenna provides approximately 4 watts of effective radiated power.

13. The system of claim 12, further comprising:
    a second converter connected to the transit conduit, the second converter being used for converting data between the second data format and a third data format, the second converter comprising at least a portion of a wireless backhaul and having a point-to-point radio; and
    a third antenna operatively coupled with the second converter.

14. The system of claim 12, wherein the input/output device is a radio interface.

15. The system of claim 12, wherein the operating frequency is within a range of approximately 5.3 to 5.8 GHz.

16. The system of claim 12, wherein the transceiver operates at approximately 2.4 GHz.

17. The system of claim 12, wherein the transceiver is configured to operate in accordance with IEEE 802.11.

18. The system of claim 12, wherein the transceiver operates at approximately 5.8 GHz.

19. The system of claim 12, wherein the transceiver uses an unlicensed information infrastructure band.

20. The system of claim 12, wherein the first antenna is a directional antenna having a gain equal to or greater than 6 dBi.

21. The system of claim 12, wherein the first antenna is an omni-directional antenna.

* * * * *